United States Patent
Erkfritz

[15] 3,662,444
[45] May 16, 1972

[54] INDEXABLE CUTTING INSERT AND HOLDER THEREFOR

[72] Inventor: Donald S. Erkfritz, Rockford, Ill.

[73] Assignee: The Ingersoll Milling Machine Company, Rockford, Ill.

[22] Filed: Mar. 9, 1970

[21] Appl. No.: 17,605

[52] U.S. Cl. ............................................. 29/96, 29/105 A
[51] Int. Cl. .................................... B26d 1/00, B26d 1/12
[58] Field of Search ........................... 29/95, 96, 105, 105 A

[56] References Cited

UNITED STATES PATENTS

| | | | |
|---|---|---|---|
| 3,146,656 | 9/1964 | Richards | 29/96 X |
| 3,310,859 | 3/1967 | Diemond et al. | 29/96 |
| 3,354,526 | 11/1967 | Erkfritz | 29/96 |
| 3,490,117 | 1/1970 | Hertel | 29/96 |
| 3,142,110 | 7/1964 | Hertel | 29/96 |
| 3,464,098 | 2/1969 | Moore et al. | 29/105 |

Primary Examiner—Harrison L. Hinson
Attorney—Wolfe, Hubbard, Leydig, Voit & Osann, Ltd.

[57] ABSTRACT

A flat and centrally apertured wafer-like insert of cutting material provides a plurality of angularly spaced available cutting tips and is located edgewise against angularly related abutments upstanding from the inner edge of a supporting surface or platform against which the insert is clamped in the final seating in a conical end of the insert aperture of the mating conical head of a screw extending through the insert aperture and threading into a hole in the platform. The insert aperture is larger than the screw shank, and the outer end of the screw hole axis is inclined relative to the axis of the insert cone at a small angle and toward the abutment corner. As a result and in the final tightening of the screw after edgewise camming of the insert against said abutments, the screw shank bends laterally to allow seating of the coned screw head in the insert recess around substantially the full peripheries of the mating cones.

7 Claims, 14 Drawing Figures

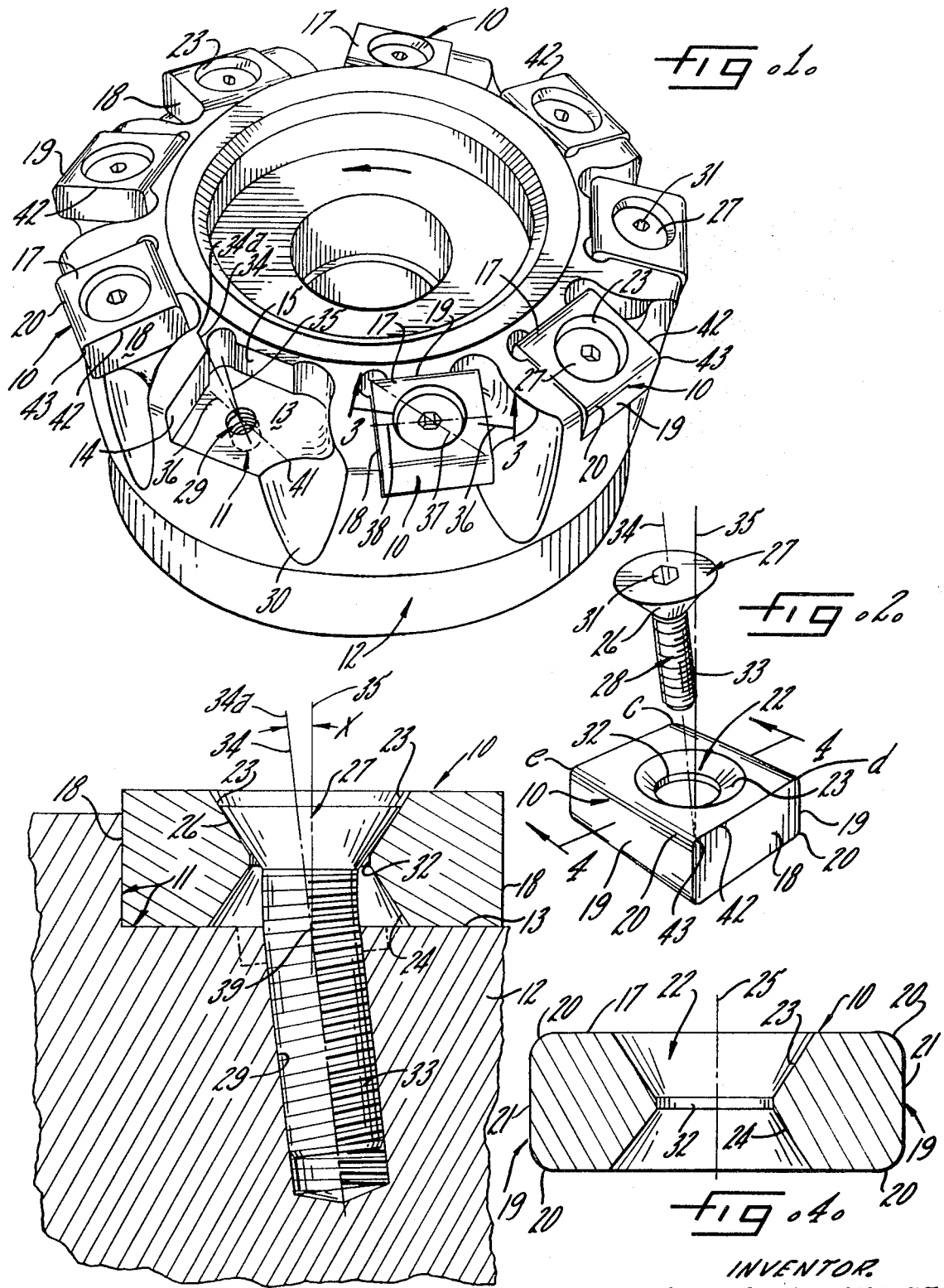

INVENTOR.
DONALD S. ERKFRITZ
BY
Wolfe, Hubbard, Leydig, Voit & Osann
ATTORNEYS.

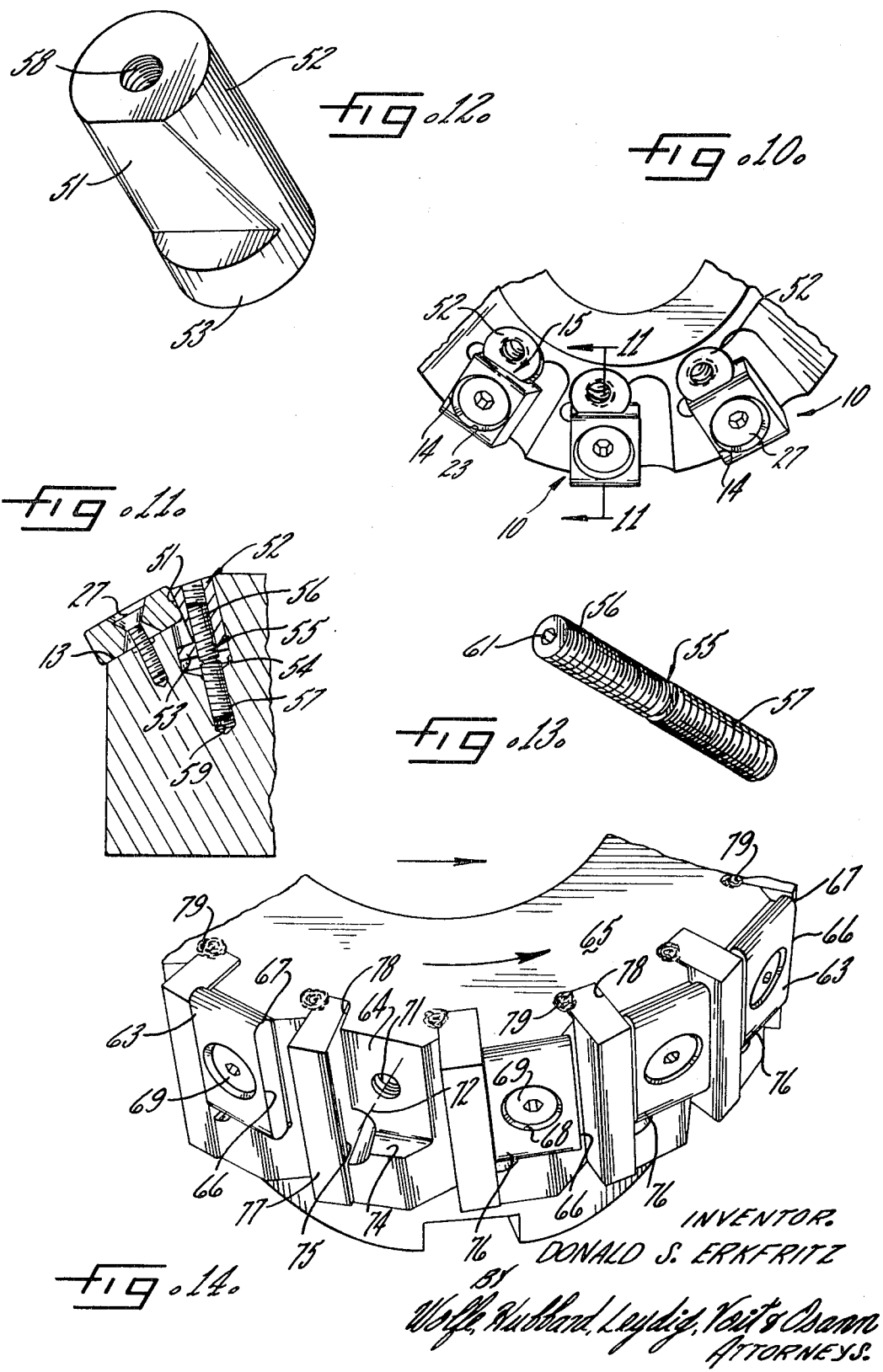

INDEXABLE CUTTING INSERT AND HOLDER THEREFOR

BACKGROUND OF THE INVENTION

This invention relates to the clamping to and the edgewise location on a supporting surface of an indexable insert of cutting material by means of a conically headed screw extending through an aperture in the insert and acting, during final tightening of the screw, to cam and press the insert edgewise against at least one locating abutment and preferably against two angularly related locating abutments upstanding from the inner edge of the platform, the diagonally opposing cutting edge of the indexable insert being then left overhanging the platform for cutting engagement with a workpiece.

Examples of indexable insert mountings of this general type are found in U.S. Pat. Nos. 2,598,581, 3,341,919 and 3,354,526.

SUMMARY OF THE INVENTION

The primary object of the present invention is to greatly increase the ruggedness of indexable insert mountings of the above character while employing standard screws and inserts of simple and inexpensive construction. Generally stated, this objective is achieved by inclining the axes of the screw hole and the conical recess of the insert in which the screw head seats at a small angle relative to each other and in a novel relation to the locating abutment or corner abutments, which relation, as permitted by lateral bending of the unsupported or free length of the screw shank in the final tightening of the screw after engagement of the insert with the abutments of its pocket, allows the conical head of the screw to seat in and around substantially the full periphery of the conical recess in the insert. Full peripheral surface contact between the screw head and insert is thus achieved instead of mere line contact as in the structures of the prior art.

BRIEF DESCRIPTION OF THE DRAWINGS

FIG. 1 is a perspective view of a cylinder boring cutter having indexable inserts fastened to the body in accordance with the present invention.

FIG. 2 is an exploded perspective view of one of the inserts and its fastening screw.

FIG. 3 is a fragmentary section taken along the line 3—3 of FIG. 1. FIG. 4 is a section taken along the line 4—4 of FIG. 2.

FIG. 10 is a fragmentary perspective view similar to FIG. 1 showing a modified form of locating abutment.

FIG. 11 is a fragmentary section taken along the line 11—11 of FIG. 10.

FIGS. 12 and 13 are perspective views of parts of the modified construction.

FIG. 14 is a fragmentary perspective view of a combined slab and face milling cutter incorporating the insert fastening means of the present invention.

DESCRIPTION OF THE PREFERRED EMBODIMENTS

Figure 5:
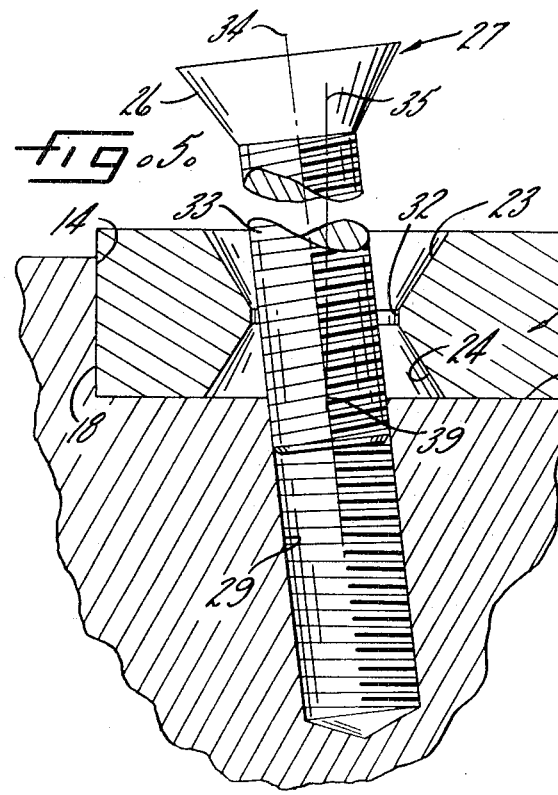
FIGS. 5 and 6 are sections similar to FIG. 3 showing different positions of the screw being threaded into the body.

While the invention may be used to advantage in securing indexable inserts of cutting material in various types of cutter bodies to provide a number of available cutting edges without resharpening, the invention has been found particularly useful in multiple blade boring cutters and therefore is shown and will first be described herein as embodied in such a cutter.

Referring then to FIGS. 1 to 8, a plurality of flat, wafer-like blades or inserts 10 of suitable cutting material such as tungsten carbide are seated in pockets 11 equally and angularly spaced around the end of a body 12 centrally apertured for mounting on the end of a spindle (not shown) and adapted to be power rotated as indicated by the arrow and fed axially to effect the boring or enlargement of a hole in a workpiece. Each of the pockets 11 is defined by a flat bottom surface or platform 13 and by abutments 14 and 15 upstanding from the trailing and inner edges of the platform whose leading and outer corner 41 terminates at a chip receiving recess 30. For use with the square ended inserts shown, the abutments 14 and 15 are preferably disposed at right angles to the platform 13 and angularly related to define a corner for receiving and locating one corner of the insert and so spaced inwardly from the periphery of the body that the diagonally opposite corner of the insert will overhang the leading edge of the platform and part of the chip recess 30. The overhanging corner is thus adapted for cutting engagement with the workpiece to be machined.

In the boring cutter illustrated, each insert 10 comprises a square block of cutting material with parallel side faces 17 and opposite parallel ends 18 which are flat and perpendicular to the side faces. The other straight and parallel ends 19 have opposite side edges 20 which may be beveled or rounded as shown and separated by flat surfaces 21 narrower than the overall thickness of the wafer.

Each insert 10 is formed with a center hole 22 recessed at both ends in the present instance to form frusto-conical seats 23 and 24 whose axes 25 coincide and are disposed precisely perpendicular to the plane of the insert. The cone angle of the seats, 60° in the form shown, is the same as that of the underside 26 of the flat head 27 of a standard screw 28 adapted to extend through the insert hole 22, thread into a mating hole 29 in the body 12 at the center of the platform 13, and, in the final tightening of the screw, clamp the insert against the platform with edges 18 and 19 of the insert in solid engagement with both of the abutments 14 and 15. Such tightening is effected by a tool engageable in an exposed center recess 31 in the screw head.

In accordance with the present invention, the cone angle of the screw head surface 26 is the same as that of the surfaces of the recesses 23 and 24, the minimum diameter 32 of the insert hole being somewhat greater than the outside diameter of the screw shank 33, and the upper end 34a of the axis 34 of the screw hole 29 is inclined at a small angle, preferably on the order of 1.5 to 5°, relative to the axis 25 of the conical recesses 23 and 24 and toward the corner defined by the abutments 14, 15. This angle, indicated at X in FIG. 3, is such that in the final tightening of the screw after engagement of one corner of the insert against the abutments 14 and 15, the shank 33 of the screw will bend laterally to allow the screw head 27 to come into full surface engagement with and seat substantially around the full periphery of the surface of the outer recess 23 as shown in FIG. 3.

Figure 6:
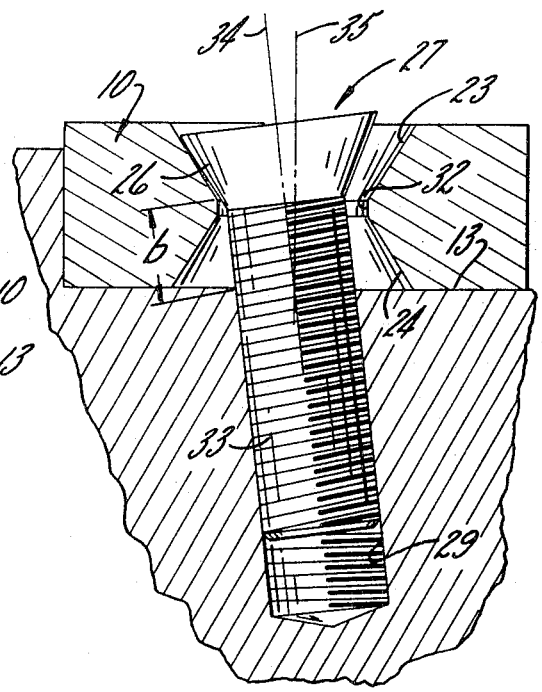

It will be observed that with the insert hole 22 sized and shaped as above described relative to the diameter of the screw shank 33, a substantial length of the latter, indicated at b in FIG. 6, will be unsupported at the time when the screw head surface 26 first engages the insert on the side of the recess 23 nearest the abutment corner. Thus, this length of the screw shank, usually about one to three times the diameter of the shank, is free to bend laterally as the screw is threaded further into the hole. It has been found in practice that with a standard steel screw having a shank diameter of 0.187 of an inch, the required lateral bending to allow full seating of the screw head (FIG. 3) may be achieved without danger of stressing the steel above its elastic limit. If desired, the bending may be facilitated and the stressing reduced by countersinking the upper end of the screw hole as indicated in dot-dash outline in FIG. 3.

To achieve the lateral bending, the screw hole is formed in the platform 13 with its axis 34 tilted within a generally upright diametrical plane 36 (FIG. 7) extending transversely of the insert and platform and disposed between a plane 37 bisecting the corner defined by the abutments 14, 15 and a plane 38 extending through the insert axis and perpendicular to the trailing abutment 14. In the tilting, the upper end 34a of the screw hole axis 34 is moved toward the abutment 14 and away from the axis 35 of the insert recess 23. Preferably, the screw hole axis is inclined at from about 1.5 to 5° relative to the insert axis 35 and desirably is positioned to intersect the axis of the located insert approximately at a point 39 in the plane of the platform 13 as shown in FIGS. 3 and 5.

With the screw and insert axes 34 and 35 located as above described, the bending of the screw shank 33 in the fastening of an insert 10 on its platform 13 is illustrated on a somewhat exaggerated scale in FIGS. 3, 5 and 6. First, the insert is placed on the platform 13 with one corner defining the desired cutting tip exposed beyond the platform and the diagonally opposite corner engaging the abutments 14 and 15. Next, the screw shank 33 is projected through the insert hole as permitted by the ample clearance at 32 and threading into the hole is started, the parts then being positioned as shown in FIG. 5. As the shank is screwed into the hole, the side of the conical head surface 26 nearest the abutment 14 first engages the conical surface 23 of the insert on the side thereof nearest the abutment 14 as shown in FIG. 6.

As the turning of the screw in the tightening direction is continued from the position shown in FIG. 6, and the screw head is drawn further into the recess 23, the first engaged side thereof acts against the head surface 26 to cam the screw head laterally away from the abutment 14 allowing the head to advance further into the recess 23. Such further entry of the screw head is permitted by lateral bending of the unsupported length $b$ of the screw shank 33 within the clearance at 32 around the hole of the insert. The bending continues until the head has become fully seated and in engagement around substantially the full periphery of the screw head as illustrated in FIG. 3.

With the screw hold axis 34 tilted in the plane 36 as above described, it will be apparent that the insert 10 will be crowded edgewise of the platform 13 and toward the abutment corner by a resultant force whose component directed toward the trailing abutment 14 is somewhat greater than the component directed toward the inner abutment 15. Since the resultant force acts along the plane 36, the insert will be held securely against the locating abutments 14, 15 and, by virtue of such full peripheral surface seating, will be clamped and held much more securely on the platform than has been possible with the screw clamps heretofore used.

With the inserts 10 located by the abutments 14, 15 and clamped against the platforms 13 as above described, it will be apparent that the leading upper edge 42 and the end 43 at the intersecting beveled surface 20 of the outer edge 19 will be positioned for cutting engagement with a rough work bore. During counter-clockwise rotation and endwise axial feeding of the body 12, these edges operate to remove a layer of material and enlarge the interior of the work hole to a diameter determined by the radial position of the tips 43 of the active cutting edges. When square inserts are employed as in the boring cutter described, the leading edges 18 which constitute cutting faces are disposed at negative rake angles in order to dispose the outer edges of the inserts at angles that provide proper clearance for the cutting tips 43. To provide proper clearance for the edges 42, the platforms are tilted somewhat so that their trailing ends are disposed below the paths traversed by the edges 42.

By employing square inserts as above described with alined conical recesses 23 and 24 at both ends of the central aperture 22, it will be apparent that eight different cutting edges 42, 43 in precisely identical radial positions are available by indexing the inserts. That is to say, by indexing the insert around the platform from the position shown in FIG. 2, a similar cutting edge defined by the diametrically opposite tip indicated at $c$ is brought into cutting position. Now, if the cutter is mounted on a body adapted for clockwise rotation, the other tips $d$ and $e$ at the corners of the same surface 17 may be brought into active position. By inverting the insert so that its opposite side will be clamped to the platform, it will be apparent that four other cutting edges 42, 43 will be available, two for left hand and two for right hand rotation of the cutter body.

Figure 9:
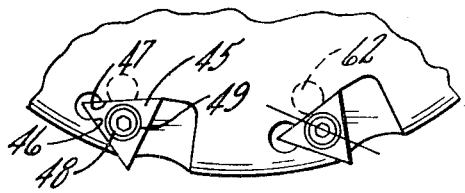
FIG. 9 is a fragmentary view similar to FIG. 7 showing triangular inserts.
Figure 7:
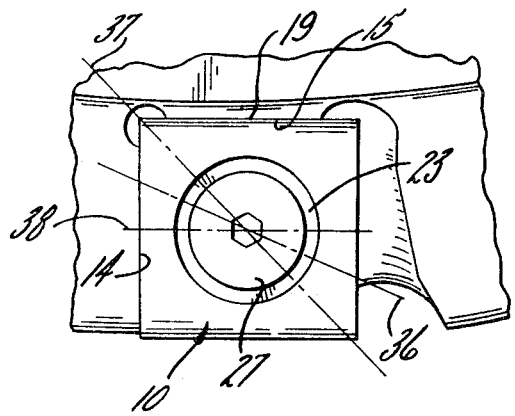
FIG. 7 is a fragmentary plan view of a part of FIG. 1.
Figure 8:
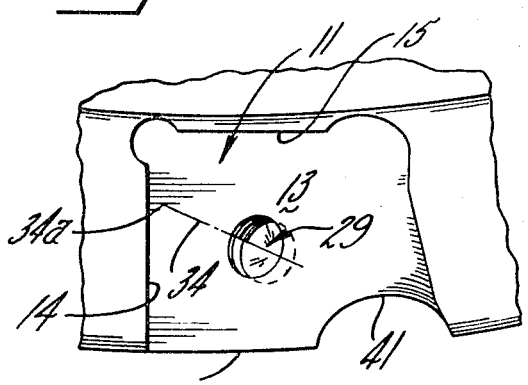
FIG. 8 is a similar view omitting the insert.

In boring cutters of the above character where the active cutting edges are to act at positive rake angles, triangular inserts 45 mounted as shown in FIG. 9 may be used and crowded against locating corner abutments 46, 47 by screws 48 arranged for lateral bending of their shanks in tightening into conical recesses 49 of the inserts, the same as in the boring cutter described above.

For some machining operations, it is desirable to employ indexable inserts of other peripheral shapes, for example, inserts having arcuate or circular cutting edges. The screw bending and clamping action above described may be employed with such indexable inserts. In such a case, the corner defining abutments would engage arcuate portions of the insert periphery.

In multiple bladed cutters adapted for finishing operations, it is desirable to provide for great precision in the radial or axial location of the active cutting edges and this, without the necessity of employing precisely dimensioned and more costly inserts. The present invention, in a more detailed one of its aspects, contemplates mounting one of the holder corners defining the insert locating abutments for limited adjustment transversely of the supporting platform and in the direction of the active cutting tip.

In the present instance, this is accomplished by making the inner locating abutment 15, in the case of a boring cutter as shown in FIG. 1, in the form of a surface 51 mounted on the cutter body 12 in a plane inclined relative to the associated platform 13 and adapted for accurate adjustment transversely of the platform. Preferably, the inclined surface 51 is the inner face of a wedge 52 having a circular cross-section 53 at one end slidable in a cylindrical bore 54 extending into the cutter body adjacent the inner edge of the platform 13 and at an angle such as to adjust the abutment 51 broadwise as the wedge is advanced into and out of the body.

Herein, such adjustment of the wedge is effected by a screw 55 having oppositely threaded end portions 56 and 57 respectively threaded in a hole 58 extending longitudinally through the wedge and a hole 59 extending into the cutter body at the bottom of the wedge recess 54. By inserting a suitable tool in a recess 61 in the outer end of the screw, the latter may be turned in opposite directions to advance the wedge into and out of the cutter body and thus adjust the radial position of the abutment 15 defined by the side 51 of the wedge. By such adjustment of the wedge of the different inserts while the latter are engaging their respective abutments 14 and 15, the wedges may be positioned to shift the inserts edgewise and outwardly and thereby locate the active cutting tips in precisely the same positions radially of the cutter body. Similarly adjustable wedges 62 indicated in phantom may be incorporated and used for diameter adjustment of the boring cutter shown in FIG. 9.

The improved security achieved in locating and clamping indexable inserts in accordance with the present invention may be utilized with equal advantage in tool holders for use in various other types of machining. As an example, FIG. 14 shows a multi-blade cutter having indexable inserts 63 clamped against platforms 64 spaced around the periphery of a rotary body 65 and presenting, in each of the available positions of each insert, cutting edges 66 adapted, during rotation and bodily feeding of the cutter as indicated by the arrows, for so-called slab milling of a flat surface and edges 67 for simultaneously face milling a surface angularly disposed, for example at right angles, to the slab milled surface.

As before, the inserts 63 are centrally apertured and formed with frusto-conical recesses 68 for receiving the heads 69 of standard screws adapted to thread into holes 71 having axes 72 inclined relative to the platforms 64 and toward abutments 74 in the same manner and at the same angles as the axes 34 above described. Abutments 75 extending along the trailing sides of the platforms cooperate with the abutments 74 to define the corners into which corners 76 of the inserts 63 are crowded by tightening of the screws to bend the screw shanks in the same manner as in the boring cutter described above.

In this milling cutter, the abutments 75 are formed by the leading face of separately formed plates 77 disposed in slots 78 in the body 65 with opposite ends secured to the body as by welds 79. Such formation of the abutments 75 is advantageous in that, in the event of breaking of the cutter in service use, the plates 77 are the parts most likely to be damaged thus providing for rebuilding of the cutter at minimum cost.

It will be apparent from the foregoing that by providing for bending of the screw shank 33 to allow for full seating of the conical screw head 27 in the recess 23 of the insert, the latter is crowded into and held in the abutment corner and held therein and against the supporting platform by full peripheral surface engagement as contrasted with the mere line contact used in the indexable insert holders of the prior art.

These advantages are achieved by the use of standard screws and low cost inserts. At the same time, normal manufacturing variations in the construction and sizing of the insert and its center hole and in the location of the abutments 14, 15 and the axis of the screw hole are compensated for automatically by automatic variations in the interfitting of the parts of the screw head and the insert in the final tightening of the screw.

I claim:

1. In a cutting tool, the combination of, a body defining an insert receiving pocket including a platform and a pair of angularly related abutments upstanding therefrom, a generally flat insert resting on said platform and having a center aperture with an upwardly flaring frusto-conical recess providing a seat whose axis is normal to the plane of the insert, a plurality of cutting edges spaced around the periphery of said insert equidistant from said axis and each adapted to be located in a cutting position outwardly beyond said platform by indexing of the insert about said axis when an opposite edge of the insert is engaging said abutments, a screw having a frusto-conical head mating with the surface of said recess and a shank of smaller diameter than said aperture extending through said insert aperture and threading into an upright screw hole in the center of said platform, the outer end of the axis of said screw hole being tilted at a small angle relative to the axis of said seat and toward at least one of said abutments whereby upon tightening of said screw the insert is cammed edgewise by the screw head engaging said seat and the screw shank is bent laterally, as permitted by the clearance within said aperture, to allow the screw head to come into substantially full peripheral surface engagement with said seat.

2. A cutting tool as defined in claim 1 in which said body is adapted for rotation and the tilting of said screw hole axis is in a plane disposed between a plane bisecting the corner defined by said abutments and a plane perpendicular to the trailing one of said abutments.

3. In a cutting tool, the combination of, a body defining an insert receiving pocket including a platform and at least one abutment upstanding therefrom, a generally flat insert resting on said platform and having an aperture with an upwardly flaring frusto-conical recess providing a seat whose axis is normal to the plane of the insert, a plurality of cutting edges spaced around the periphery of said insert and each adapted to be located in a cutting position by indexing of the insert on said platform, a screw having a frusto-conical head mating with the surface of said recess and a shank of smaller diameter than said insert aperture extending through said aperture and threading into an upright screw hole in said platform, the upper end of the axis of said screw hole being tilted at a small angle relative to the axis of said seat and toward said abutment whereby upon tightening of said screw the insert is cammed edgewise and toward said abutment by the screw head engaging said seat and the screw shank is bent laterally, as permitted by the clearance within said aperture, to allow the screw head to come into substantially full peripheral surface engagement with said seat.

4. A cutting tool as defined in claim 3 in which the length of said screw shank between said seat and the upper end of said screw hole is free to bend laterally and allow said screw head to engage said seat substantially around the full periphery thereof in the final tightening of the screw to clamp said insert against said platform.

5. A cutting tool as defined in claim 4 in which the unsupported length of said screw shank includes a length disposed within a recess countersunk in said body at the upper end of said screw hole.

6. A cutting tool as defined in claim 3 in which opposite ends of said insert aperture are formed with frusto-conical recesses whose surfaces converge axially toward each other to a diameter at their adjacent ends enough greater than the diameter of said screw shank to permit lateral bending thereof to allow full seating of the screw head in the outer one of said recesses.

7. In a cutting tool, the combination of, a body defining an insert receiving pocket including a platform and at least one abutment projecting outwardly therefrom, a wafer-like cutting insert resting on said platform and having an aperture with an outwardly flaring frusto-conical recess providing a seat whose axis is normal to the plane of the insert, a plurality of cutting edges spaced around the periphery of said insert and each adapted to be located in a cutting position by indexing of the insert on said platform, a screw having a frusto-conical head mating with the surface of said recess and a shank of smaller diameter than said insert aperture extending through said aperture and into a screw hole opening outwardly of said platform, said screw head and screw shank being coaxial prior to tightening of said screw, the outer end of the axis of said screw hole being tilted at a small angle relative to the axis of said seat and toward said abutment whereby upon tightening of said screw the insert is cammed edgewise and toward said abutment by the screw head engaging said seat and the screw shank is bent laterally relative to the screw head, as permitted by the clearance within said aperture, to allow the screw head to come into substantially full peripheral surface engagement with said seat.

* * * * *